(12) United States Patent
Li et al.

(10) Patent No.: US 8,892,650 B2
(45) Date of Patent: Nov. 18, 2014

(54) SPONSORED STORIES APPLICATION PROGRAMMING INTERFACE (API)

(75) Inventors: Ning Li, Newark, CA (US); Philip Anastasios Zigoris, San Francisco, CA (US); Neville Bowers, Palo Alto, CA (US); Robert Kang-Xing Jin, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 42 days.

(21) Appl. No.: 13/539,399

(22) Filed: Jun. 30, 2012

(65) Prior Publication Data

US 2014/0006501 A1    Jan. 2, 2014

Related U.S. Application Data (63) Continuation-in-part of application No. 12/193,702, filed on Aug. 18, 2008, now Pat. No. 8,799,068.

(60) Provisional application No. 60/985,631, filed on Nov. 5, 2007.

(51) Int. Cl.
*G06Q 30/00* (2012.01)
*G06F 15/16* (2006.01)

(52) U.S. Cl.
USPC .............. 709/204; 705/14.66; 705/14.67

(58) Field of Classification Search
CPC .......... G06Q 30/0251; G06Q 30/0255; G06Q 30/0269
USPC .................................................. 709/204
See application file for complete search history.

(56) References Cited

U.S. PATENT DOCUMENTS

| | | | | |
|---|---|---|---|---|
| 2009/0119167 A1* | 5/2009 | Kendall et al. | ................. | 705/14 |
| 2011/0029388 A1 | 2/2011 | Kendall et al. | | |
| 2012/0109757 A1 | 5/2012 | Kendall et al. | | |

FOREIGN PATENT DOCUMENTS

| | | | |
|---|---|---|---|
| JP | 2002-092408 A | 3/2002 | |
| JP | 2004-192166 A | 7/2004 | |
| KR | 10-2011-0032878 A | 3/2011 | |
| WO | WO 2011/078975 A1 | 6/2011 | |

OTHER PUBLICATIONS

PCT International Search Report and Written Opinion, PCT Application No. PCT/US2013/043189, Aug. 28, 2013, eleven pages.

* cited by examiner

*Primary Examiner* — Kevin Bates
*Assistant Examiner* — Emad Siddiqi
(74) *Attorney, Agent, or Firm* — Fenwick & West LLP (57) ABSTRACT

To provide a sponsored story unit, the social networking system receives a story request from an advertiser. The story request specifies properties of content used to generate the sponsored story. When the social networking system stores an object or an action performed on an object, properties associated with, and describing, the object or the action are also stored. For example, properties of an object include an object type, an object identifier, metadata describing the object or other suitable information. The social networking system identifies actions or objects associated with users connected to a viewing user having one or more properties included in a story request. A sponsored story is generated from the identified actions or objects and presented to a viewing user.

21 Claims, 3 Drawing Sheets

SPONSORED STORIES APPLICATION PROGRAMMING INTERFACE (API)

CROSS-REFERENCE TO RELATED APPLICATIONS

This application is a continuation-in-part of co-pending U.S. application Ser. No. 12/193,702, filed on Aug. 18, 2008, which claims the benefit of U.S. Provisional Application No. 60/985,631, filed on Nov. 5, 2007, each of which is hereby incorporated by reference in its entirety.

BACKGROUND

This invention generally pertains to social networking, and more specifically to specifying criteria for generating stories sponsored by an advertiser.

Social networks, or social utilities that track and enable connections between users (including people, businesses, and other entities), have become prevalent in recent years. These social networking systems allow users to communicate information more efficiently. For example, a social networking system user may post contact information, background information, job information, hobbies, and/or other user-specific data to a location associated with the user on a social networking system. Other users can then review the posted data by browsing user profiles or searching for profiles including specific data. Social networking systems also allow users to associate themselves with other users, creating a web of connections among the users of the social networking system. These connections among the users can be leveraged by the social networking system to provide more relevant information to each user in view of user-specific interests.

Social networking systems typically include a system for connecting users to content most likely to be relevant to different users. For example, a social networking system may group users according to one or more common attributes in their profiles, such as geographic location, employer, job type, age, music preferences, interests, or other attributes. Users of the social networking system or external parties, such as advertisers, can then use these groups to customize information delivery based on properties of the groups to increase the likelihood that users in a group receive information of interest.

Advertisers have attempted to leverage information about social networking system users by using information from the social networking system to target advertisements ("ads") to different users. Commonly, an advertiser identifies user characteristics to the social networking system, which identifies users having one or more of the characteristics and serves an ad from the advertiser to the users having at least one of the characteristics. For example, an advertiser identifies users with an affinity for a band and a location near a venue where the band is performing, and the social networking system presents banner advertisements for the band's concert to users having the identified information in their profiles.

Additionally, social networking systems may allow advertisers to sponsor stories informing a social networking system user of actions taken by other users. Such a "sponsored story" seeks to increase user interaction by providing more personalized information to a user based on actions taken by social networking system users. For example, if a viewing user is connected to an additional user who has "liked" an advertiser's fan page, the advertiser may sponsor a story that is communicated to the viewing user indicating that the additional user has "liked" the page. However, advertisers currently have limited ability identify sponsored stories for communication to other users. This limits the ability of advertisers to flexibly and effectively promote user actions based on the information available within the social networking system.

SUMMARY

Embodiments of the invention provide sponsored story units including a sponsored story and/or one or more related posts to a viewing user of the social networking system. The sponsored story describes an action taken by a user of a social networking system to whom the viewing user is connected and an object on which the action was taken. For example, the sponsored story may indicate that a particular user listened to an identified song or that the particular user shared a particular link. Hence, a sponsored story leverages information stored by the social networking system about objects in the social networking system and actions performed on various objects.

To provide a sponsored story unit, the social networking system receives a story request from an advertiser. The story request specifies properties of content used to generate the sponsored story. When the social networking system stores an object or an action performed on an object, properties associated with, and describing, the object or the action are also stored. For example, properties of an object include an object type, an object identifier, whether the object is internal or external to the social networking system metadata describing the object or other suitable information. Examples of properties of an action include an action type, a time when the action occurred, the source of the action, whether the action is external or internal to the social networking system or other suitable information. By specifying properties of the content used to generate a sponsored story, story requests allow specific actions and/or objects to be identified and included in sponsored stories. For example, a story request may specify an action type of "listened" and an object type of "song" to provide sponsored stories indicating songs to which users connected to the viewing user listened. This allows the advertiser greater ability to customize the content of sponsored stories in an effort to increase the likelihood the viewing user interacts with the sponsored stories.

Based on the received story request, the social networking system accesses stored user profiles of users connected to the viewing user and identifies actions performed by the users connected to the viewing user and/or objects on which the users connected to the viewing user performed actions. Actions and/or objects associated with properties matching one or more of the properties specified by the story request are identified as candidate content for inclusion in the sponsored story corresponding to the story request. In one embodiment, the candidate content is determined in response to a viewing user requesting content, such as a web page. The social networking system may then select content for the sponsored story from the candidate content and generate the sponsored story for serving to the viewing user.

Specifying properties of content for a sponsored story in a story request allows advertisers increased flexibility in promoting products or brands by providing more specialized content in sponsored stories. For example, a record label may provide story requests to generate sponsored stories identifying users listening to a song by an artist affiliated with the record label. In this example, the story request may specify an action type of "listened" an object type of "song" and metadata associated with the object identifying the artist. In some embodiments, the sponsored story unit presented to the viewing user includes a comment or review previously posted by a user in addition to the sponsored story. The sponsored story unit may also include an interface element allowing the user to interact with content included in the sponsored story. For example, an interface element allows the viewing user to listen to a song or to view content included in the sponsored story.

Hence, advertisers may identify any content stored by a social networking system for promotion to social networking system users. Identifying properties, or other attributes, of content in a request for content, such as a story request, allows an advertiser greater ability to customize content promoted to users based on advertiser interests or goals. While a story request may allow an advertiser to select content based on actions performed by a user, it (or another content request) may also allow an advertiser to identify an object or other content stored by the social networking system for promotion to users by specifying one or more properties of the object or other content.

The features and advantages described in this summary and the following detailed description are not all-inclusive. Many additional features and advantages will be apparent to one of ordinary skill in the art in view of the drawings, specification, and claims hereof.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term "friend" need not require that users actually be friends in real life, (which would generally be the case when one of the users is a business or other entity); it simply implies a connection in the social networking system.

In addition to interactions with other users, the social networking system provides users with the ability to interact with various types of objects supported by the social networking system. An object may represent a variety of things, including, without limitation, profiles, applications (e.g., games playable within the social networking system), events (e.g., a representation of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, etc. Objects may also be defined by a third party outside of the social networking system. For example, a web page domain host may define an object and an action on the social networking object such that a user's interaction with the object on the web page may be registered with the social networking system.

Objects maintained by the social networking system are associated with, or include, properties describing the objects. Properties of an object are information describing the object. In some embodiments, properties are stored as metadata associated with an object. Example properties of an object include a title, a creation date, an object identifier, an object type, an object description or other data associated with the object. In some embodiments, a subset of properties associated with an object may depend on other properties of the object. For example, a subset of properties associated with an object may depend on an object type. As an example, an object having an object type of "song" may be associated with additional properties including an artist, an album, a song length, album art etc. As another example, an object having an object type of "article" may be associated with additional properties such as author, genre, keywords, publication date or other data describing an article. Properties associated with an object may also have sub-properties themselves, providing further detail about a particular property. For example, an artist property of a song object may have sub-properties identifying a record label sponsoring the artist, a country of origin or other information about the artist.

Social networking system users may interact with objects by performing one or more actions on the objects. A user may perform different actions on different types of objects. For example, a user may join a group, attend an event, check-in to a location, become a fan of an entity's page, post to a fan page, etc. Hence, different actions establish different associations between a user and an object.

Actions performed on objects maintained by a social networking system also have properties describing the actions. In some embodiments, properties are stored as metadata associated with an action. Example properties of an action include an action type, a date when the action was performed, an object identifier of the object on which the action was performed, a user identifier of the user performing the action other data associated with the action. Similar to properties of an object, a subset of the properties of an action may depend on another property of an action. For example, an action type may determine additional properties associated with an action. As an example, if a user listens to a song object, the social networking system stores a property identifying the action as "listening," and additional properties describing a date and time when the listening occurred, a percentage of the song object to which the user listened or other data. As with properties of objects, properties of actions may have sub-properties to provide additional information about different properties.

While the preceding examples described actions that may be taken on objects included in the social networking system, users may also perform actions on objects outside of a domain associated with the social networking system. For example, a user may read an article on a newspaper domain, listen to a song on a music application, "like" a web page maintained by a domain other than that associated with the social networking system, etc. Many other types of actions between users and objects inside or outside of the social networking system are possible. An action may also be generation of content by the user for presentation by the social networking system. For example, a user may post data, such as comments, on an entity's fan page.

The social networking system includes one or more data stores including data describing actions performed by its users on objects maintained by the social networking system. Stored actions may be associated with a user profile, maintained by the social networking system, of a user performing the action. Additionally, the social networking system associates a stored action with an object on which the action was performed and stores the association, allowing subsequent retrieval of actions performed by social networking system users on various objects. Associating actions with user profiles allows retrieval of properties of an action and/or properties of an object based on a user profile.

The social networking system presents a variety of content to its users. Examples of content that may be displayed to a user include images, videos, audio data, pictures, etc. Additionally, the social networking system may display a newsfeed to its users. The newsfeed includes stories describing actions taken by social networking system users on objects maintained by the social networking system. For example, a newsfeed presented to a viewing user includes stories describing actions performed on objects by other users connected to the viewing user. When selecting stories for inclusion in a newsfeed, the social networking system may use a variety of factors. In one embodiment, advertisers may provide the social networking system with compensation for including stories selected by the advertiser in newsfeeds presented to users. This allows the advertiser to "sponsor" stories to increase the likelihood that the stories are presented to social networking system users. Hence, sponsoring a story allows advertisers to increase the likelihood that users view the story by providing the social networking system with an incentive to present sponsored stories to users.

In this way, the social networking system provides one or more sponsored story units for display to a viewing user in the viewing user's newsfeed. In addition to the newsfeed, the sponsored stories may be presented to the viewing user in any other portion of a user interface displayed to the viewing user, either in the social networking system itself or via an external system (such as a third-party web page) that is in communication with the social networking system. The sponsored story unit includes a sponsored story describing one or more actions performed on an object by one or more users connected to the viewing user. For example, a sponsored story indicates that a viewing user's friend listened to a song, read an article or performed another type of action. Embodiments of sponsored stories, or social ads, are described in U.S. application Ser. No. 12/193,702, filed Aug. 18, 2008, published as U.S. Patent Application Publication No. 2009/0119167, which is incorporated in its entirety be reference herein.

In one embodiment, a sponsored story unit includes an interface element in addition to the sponsored story. The interface element allows a user viewing the sponsored story unit to interact with the sponsored story. In some embodiments, the interface elements may vary based on the content of the sponsored story. For example, a sponsored story describing user interaction with an article may include a link allowing the user viewing the sponsored story to access the article. As another example, a sponsored story indicating a user listened to a song may include an interface element allowing the user viewing the sponsored story to listen to the song or to purchase the song.

A sponsored story unit may also include an input element that receives content from the user, such as a comment, and associates the received content with the sponsored story unit. For example, the input element is a text entry field allowing a user viewing the sponsored story unit to provide a comment about the sponsored story. By allowing a viewing user to interact with a sponsored story unit via an input element, the social networking system increases the likelihood of user engagement when viewing the sponsored story unit. In addition, content received via the input element may be used when subsequently distributing sponsored story units to other users. For example, content received from a viewing user via the input element may be reported in sponsored story units subsequently presented to the viewing user's friends.

Figure 1:
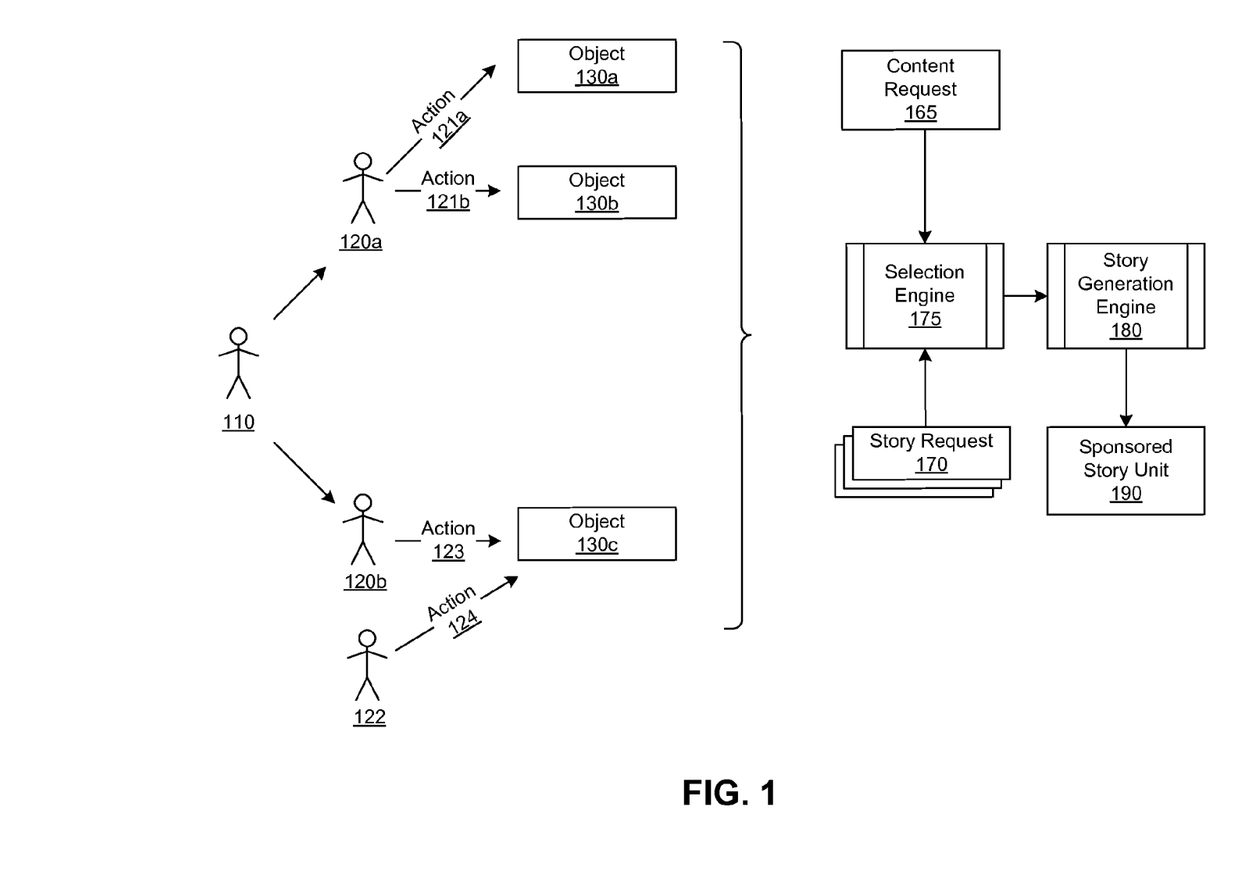
FIG. 1 is a diagram of a process for generating a sponsored story unit, in accordance with an embodiment of the invention.

FIG. 1 illustrates a process for generating a sponsored story unit 190 based on properties provided by advertisers. A selection engine 175 included in a social networking system receives a request 165 for content from a viewing user 110. For example, a request 165 for content is a request for a page generated by the social networking system, such as a page including a newsfeed or other region suitable for displaying a sponsored story unit. Responsive to receiving the request 165 for content, the selection engine 175 selects one or more story requests 170 received from advertisers to generate one or more sponsored story units. One or more story request 170 may be selected from story requests 170 received from one or more advertisers and stored by the social networking system. Each of the stored story requests 170 where each story request 170 identifies one or more properties of content included in a sponsored story. The properties identified by a story request 170 may be properties of an object, properties of an action, sub-properties of properties of an action, sub-properties of properties of an object or a combination of the preceding. This allows an advertiser to specify properties of the content, such as an object and/or an action, included in a sponsored story unit, customizing the content provided to social networking system users.

To select a specific story request 170 to generate a sponsored story unit for a viewing user, the selection engine 175 accesses stored story requests 170 and determines whether users connected to the viewing user have performed an action having one or more properties identified by a story request 170 and/or have performed an action on an object having one or more properties identified by a story request 170. Hence, a story request 170 specifies one or more of an action, an object on which an action was performed, a property of the object and/or a property of an action property, allowing advertisers to customize the content of sponsored stories For example, a story request 170 identifies a song by a particular artist and an action of "listen," so the selection engine 175 determines whether users connected to the viewing user 110 have listened to the identified song. Referring to FIG. 1, a first user 120a connected to the viewing user 110 has performed a plurality of actions 121a, 121b. For purposes of illustration, object 130a in FIG. 1 is a song by the artist identified in the example story request 170, and the action 121a by the first user 120 is listening to the song. In FIG. 1, the first user 120a also performs an additional action 121b of liking another object 130b, such as a page. Also in the example of FIG. 1, a second user 120b connected to the viewing user 110 performs an action 123 of listening to an additional object 130c, which is a song by a different artist than specified by the example story request 170. FIG. 1 also depicts an additional user 122 performing an action 124 on the additional object 130c, such as liking the song. In this example, the selection engine 175 selects the action 121a on the object 130a, as the action 121a and the object 130a have the properties identified by the example story request 170.

A story generation engine 180 in the social networking system 100 generates one or more sponsored story units 190 from the actions performed and/or objects on which the action was performed by users connected to the viewing user identified by the story request 170. If the selection engine 175 selects actions my multiple users 120 connected to viewing user 110 satisfying the properties in the story request 170, the story generation engine 180 may use various factors to select the action, object and user for generating the sponsored story unit. Selection of the content of the sponsored story unit is further described below. For example, if two users connected to the viewing user 120 perform an action having a property specified in a story request on an object having a property specified in the story request, the generated sponsored story may describe the action performed by the user with whom the viewing user 110 has a higher affinity. An affinity between the viewing user 110 and another user represents the likely interest in the viewing user 110 has for actions performed by the user or for content provided by the user. For example, the affinity between users is higher if the users frequently interact with each other through the social networking system 100. The sponsored story unit 190 generated by the story generation engine 180 includes a description of action performed on an object by a user connected to the viewing user 100 based on the sponsored story request 170. The generated sponsored story unit 190 may optionally include interface elements for receiving input from the viewing user 110.

System Architecture

Figure 2A:
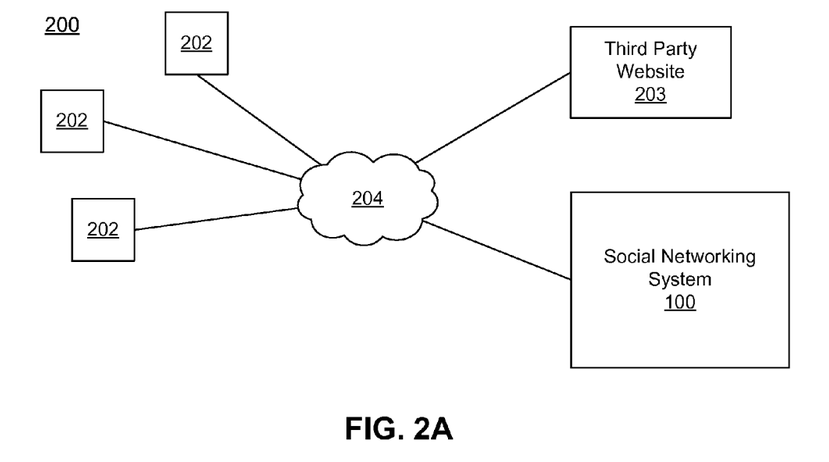
FIG. 2A is a high level block diagram illustrating a system environment suitable for operation of a social networking system, in accordance with an embodiment of the invention.

FIG. 2A is a high level block diagram illustrating a system environment 200 in which a social networking system 100 operates. The system environment 200 includes one or more client devices 202, one or more third-party websites 203, a social networking system 100, and a network 204. While only three client devices and one third-party website are shown in FIG. 2A, in other embodiments, any number of client devices 202 may be included. In alternative configurations, different and/or additional entities can also be included in the system.

The client devices 202 include one or more computing devices that can receive user input and can transmit and receive data via the network 204. For example, the client devices 202 may be desktop computers, laptop computers, tablet computers, smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 allow various users can communicate with the social networking system 100. The third party website 203 is coupled to the network 204 in order to communicate with the social networking system 100.

The social networking system 100 comprises a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally stores other objects, such as fan pages, events, groups, advertisements, general postings, etc.

Figure 2B:
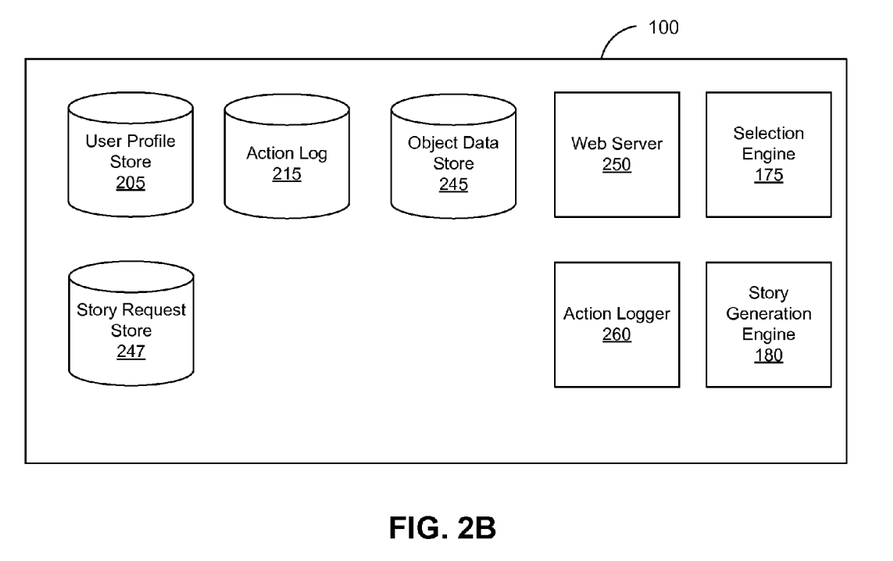
FIG. 2B is a block diagram of various components of a social networking system, in accordance with an embodiment of the invention.

FIG. 2B is an example block diagram of various components of the social networking system 100. The social networking system 100 includes a profile store 205, an object data store 245, an action logger 260, an action log 215, a selection engine 175, a story generation engine 180, a story request store 247 and a web server 250. In alternative configurations, different components can be included in the system 100.

Each user of the social networking system 100 is associated with a user profile, which is stored in the user profile store 205. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 205 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 205 also includes references to actions by the corresponding user performed on objects in the object data store 245 and stored in the action log 215.

The social networking system 100 maintains data about a number of different types of objects with which a social networking system user may interact. Examples of objects include events, plans, pictures, audio data, video data, groups or any other suitable data. The object data store 245 includes data identifying each object maintained by the social networking system 100 and properties associated with different objects. For example, the object data store 245 includes metadata associated with different types of objects used to describe properties of different objects. For example, for event objects, the object data store 245 includes metadata identifying a title, location, time, list of invited users, list of attending data structures specifying the time and location for an event. Additional examples of properties of an object are further described in conjunction with FIG. 1. The social networking system 100 associates a unique object identifier with each object, simplifying retrieval of different objects or accessing properties of different objects. The object data store 245 may also include data identifying objects external to the social networking system 100.

The action logger 260 receives communications about user actions performed on objects internal to and/or external to the social networking system 100, populating the action log 215 with information about user actions. Such actions may include, for example, adding a connection to another user, sending a message to another user, uploading an image, reading a message from another user, viewing content associated with another user, attending an event posted by another user, among others. In addition, a number of actions described in connection with objects are directed at particular users, so these actions are associated with those users as well. These actions are stored in the action log 215. The action logger 260 also captures properties of actions to provide additional information about actions performed by users. Properties of actions are further described above in conjunction with FIG. 1.

The action log 215 may be used by the social networking system 100 to track user actions on the social networking system 100, as well as user actions on external websites that communicate information to the social networking system 100. Users may interact with various objects on the social networking system 100, including commenting on posts, sharing links, and checking-in to physical locations via a mobile device, accessing content items in a sequence or other interactions. Additional examples of interactions with objects on the social networking system 110 included in the action log 320 include commenting on a photo album, communications between users, becoming a fan of a musician, adding an event to a calendar, joining a groups, becoming a fan of a brand page, creating an event, authorizing an application, using an application and engaging in a transaction. Information describing these actions is stored in the action log 215. Properties describing characteristics or attributes of different actions are also stored in the action log 215 and associated with their corresponding actions. For example, the action log 215 includes metadata associated with each action, with the metadata specifying properties of its associated action. In some embodiments, data from the action log 215 is used to infer interests or preferences of the user, augmenting the interests included in the user profile and allowing a more complete understanding of user preferences.

The action log 215 may also store user actions taken on external websites and properties associated with these actions. A property associated with actions stored in the action log 215 may indicate whether the action was performed on the social networking system 100 or external to the social networking system 100. In some embodiments, an additional property is associated with actions indicating whether the object on which the action was performed is internal to the social networking system 100 or external to the social networking system 100. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 215 records data about these users, including webpage viewing histories, advertisements that were engaged, purchases made, and other patterns from shopping and buying.

In general, the web server 250 links the social networking system 100 via the network 204 to one or more of the client devices 202, as well as to one or more third party websites 203. The web server 250 may include a mail server or other messaging functionality for receiving and routing messages between the social networking system 100 and the client devices 202 or third party websites 203. The messages can be instant messages, queued messages (e.g., email), text and SMS messages, or any other suitable messaging technique. In one embodiment, the web server 250 receives requests for content from client devices 202 and communicates the requests to the story generation engine 180 or other components for generating content to be presented to a user associated with a client device 202. As further described above, the content presented to the user may include one or more sponsored story units, allowing an advertiser to inform the user of actions involving a brand or product associated with the advertiser.

The story request store 247 stores story requests 170 received from advertisers or other sources. In one embodiment, when a new story request is received from an advertiser, data describing attributes of the story request is generated and stored in the story request store 247. A unique identifier is associated with each story request. For example, the story request store 247 stores a unique story request identifier, data identifying the advertiser from which the story request was received, data describing the properties specified by the story request (e.g., object, action, property of an object, property of an action, sub-property of a property of an action, sub-property of a property of an object, etc.) and other data identifying a story request. Story requests from the story request store 247 are retrieved and used by the selection engine 175 to identify content for inclusion in a sponsored story unit. Each story request 170 can additionally include other parameters for defining a sponsored story unit. For instance, a story request 170 may indicate whether certain interface elements should be included, information for any content to be presented, any associated advertisements to be presented, etc.

The selection engine 175 accesses story requests included in the story request store 247 and identifies data from the user profile store 205, action log 215 and object data store 245 having one or more of the properties in a story request. In one embodiment, the selection engine 175 can retrieves a number of story requests from the story request store 247. The story requests may have been previously received by the social networking system 100 from advertisers, advertising brokers, and/or the like. Each story request identifies one or more properties of an action taken by a user of the social networking system 100 and/or one or more properties of an object in the social networking system 100 on which a user acted. Hence, the story request identifies content to be included in a sponsored story unit and the selection engine 175 identifies content stored by the social networking system 100 having the properties identified by a story request. For example, a sponsored story request identifies an action of listening to an object having particular properties, so the selection engine 175 identifies stored actions, by users to whom a viewing user is connected, having a type of "listen" performed on an object having the specified properties. Selection of content for a sponsored story unit based on a story request is further described below.

Based on the retrieved story requests, the selection engine 175 identifies candidate content for inclusion in sponsored story units. For example, the selection engine 175 determines whether at least one user connected to a viewing user has performed an action having a property identified by a story request and/or has performed an action on an object having a property identified by a story request. For example, a story request 170 may specify an action of reading an object having an article type that was authored by a specified author. Thus, if users connected to the viewing user read the article having the specified author, those actions would be included as candidate content.

The selection engine 175 may identify any content items stored by the social networking system 100 for inclusion in a sponsored story or for otherwise being distributed to social networking system users. For clarity, the selection engine 175 is described herein as identifying content items based on properties of objects, properties of actions, sub-properties of objects and/or sub-properties of actions, the selection engine 175 may receive properties, or other suitable data, for identifying objects stored by the social networking system 100.

This allows the selection engine 175 to identify any content stored by the social networking system 100 for presentation to users based on properties or other data included in a received story request or another request for content. Hence, the selection engine 175 allows advertisers to select any type of content stored by the social networking system 100 to be promoted, or otherwise presented, to social networking system users.

The story generation engine 180, or the selection engine 175, selects content from the candidate content for the sponsored story unit. Any suitable method may be used to select content for the sponsored story unit. For example, the story generation engine 180 determine the probability that the viewing user will access different candidate content and select the candidate content having the highest probability. As another example, the story generation engine 180 selects the candidate content having a highest expected value, computed as a function of a per-click bid price for the story request and weighted by the probability that the viewing user will access the sponsored story unit. In various embodiments, the probability that the viewing user 110 will click on a sponsored story unit is based on a weighted function of the viewing user's affinities for the users performing the actions included in the candidate content.

Hence, the candidate content identified by the selection engine 175 includes actions and/or objects having one or more properties specified by story requests, and the content for a sponsored story unit is selected from the candidate content by the selection engine 175 or the story generation engine 180. After selecting content from the candidate content, the story generation engine 180 generates a sponsored story unit from the selected content. In one embodiment, the story generation engine 180 selects content for the sponsored story unit based on the user engagement values for the actions or the objects included in the candidate content. The user engagement values may be based on the number of users who have viewed or commented on an object or performed a similar action. For example, an action may be determined to have a high user engagement value if the action or object has been "liked" by a relatively large number of users.

In another embodiment, the story generation engine 180 selects the content for a sponsored story unit based on the affinity of the viewing user for users performing actions included in the candidate content. The affinity for the viewing user for another user may be determined from the number of interactions between the viewing user 110 and the other user. It should be appreciated that methods for selecting the content included in a sponsored story unit may be combined in any suitable manner. For example, in selecting the content for the sponsored story unit, the story generation engine 180 may consider both user engagement values and affinity, or any other suitable combination of metrics. The story generation engine 180 may differently weight data used to select the content of the sponsored story unit.

A sponsored story unit generated by the story generation engine 180 includes a sponsored story describing an action performed by at least one user connected to the viewing user on an object, based on data in a sponsored story request. For example, the sponsored story unit indicates that two users connected to the viewing user listened to a song by an artist associated with a particular record label. The generated sponsored story unit 190 may further include additional information stored in the social networking system 100, such as the name and a picture of the at least one of the users connected to the viewing user links to the user profile, etc. In one embodiment, the sponsored story unit can optionally include an interface element allowing the viewing user 110 to interact with the sponsored story unit. For example, the viewing user 110 can use the interface element to listen to song, navigate to a webpage to read an article, etc.

The generated sponsored story unit is then communicated to the viewing user for presentation on a client device 202. The sponsored story unit may be displayed to the viewing user in a variety of ways, such as a newsfeed story, a banner, an interactive pop-up, or in association with an application associated with the social networking system executing on the client 202. In one embodiment, the generated sponsored story unit may be paired with an advertisement. For example, the story request from which the sponsored story unit is generated may identify an advertisement to be displayed with the sponsored story unit and the sponsored story unit is displayed along with the advertisement. In one embodiment, the advertisement and sponsored story unit may be formatted such that they appear as a single unit.

Method for Generating Sponsored Story Units

Figure 3:
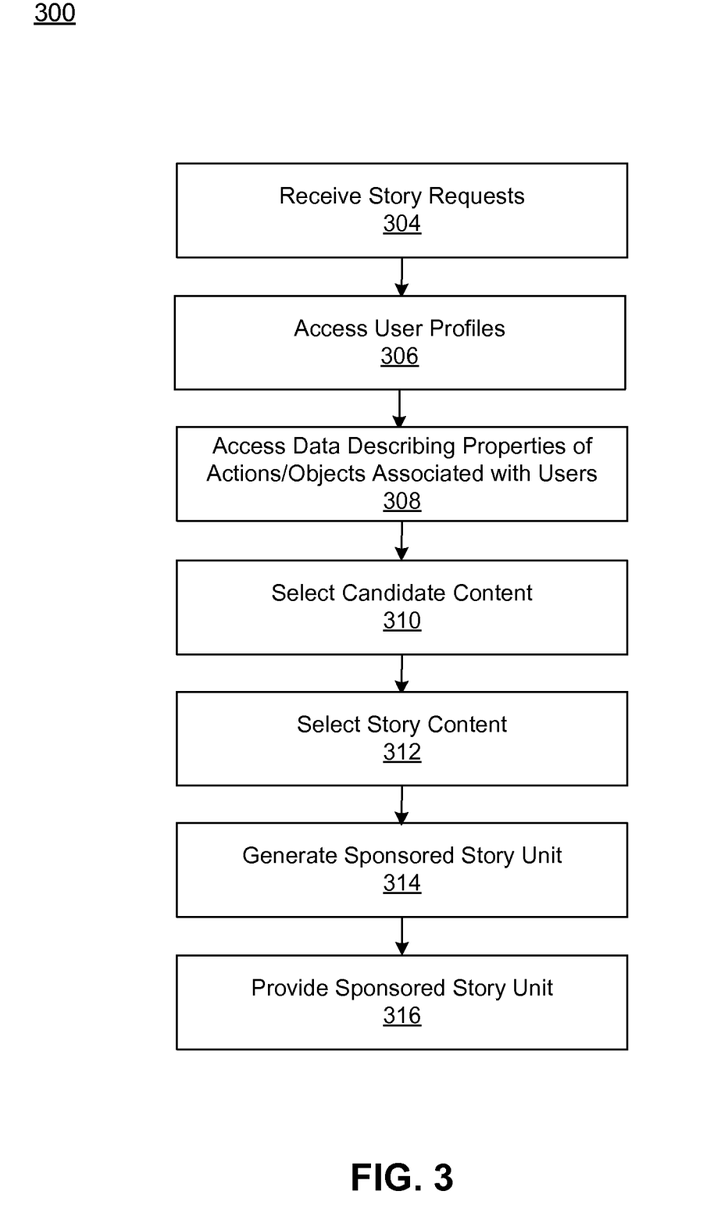
FIG. 3 is a flow chart of a process for providing a sponsored story unit to a user of a social networking system, in accordance with an embodiment of the invention.

FIG. 3 illustrates one embodiment of a method 300 for generating a sponsored story unit in a social networking system 100. A user profile store 205 in the social networking system includes user profiles associated with social networking system users, including a user profile associated with a viewing user. For purposes of illustration, FIG. 3 shows generation of a sponsored story unit for presentation to the viewing user. For example, the method 300 is executed responsive to the viewing user requesting content from the social networking system 100.

The social networking system 100 receives 304 story requests from one or more advertisers or other entities. Each story request identifies one or more properties of content included in a sponsored story, as described above in conjunction with FIG. 1. The properties identified by a story request 170 may be properties of an object, properties of an action, sub-properties of properties of an action, sub-properties of properties of an object or a combination of the preceding. Hence, story requests allow advertisers to specify properties of the content, such as an object and/or an action, included in a sponsored story unit to customize the content of sponsored stories presented to other users, such as the viewing user.

The selection engine 175 determines other users connected to the viewing user and accesses 306 the user profiles associated with the users connected to the viewing user. From the accessed user profiles, the selection engine 175 identifies actions taken by the users connected to the viewing user and the objects on which the actions were performed. For example, the selection engine 175 determines user identifiers of the users connected to the viewing user and accesses the object data store 245 and the action log 215 to identify actions and/or objects associated with the user identifiers. The selection engine 175 accesses 308 data from the object data store 245 and/or the action log 215 describing one or more properties of the actions performed by the users connected to the viewing user and/or properties of objects on which the actions were performed.

Based on the properties of actions and/or objects included in story requests, the selection engine 175 selects 310 candidate content for sponsored story units from the actions and/or objects associated with the users connected to the viewing user. The selected candidate content includes actions and/or objects having one or more of the properties specified by a sponsored story request. Thus, candidate content includes one or more of an action performed by a user connected to the viewing user having a property from a story request, an object on which a user connected to the viewing user performed an action having a property from a story request, an action performed by a user connected to the viewing user having a sub-property specified by a story request and/or an object on which a user connected to the viewing user performed an action having a sub-property specified by a story request.

After selecting 310 candidate content, the selection engine 175 or the story generation engine 180 selects 312 story content for inclusion in a sponsored story unit for presentation to the viewing user. The story content includes an action performed by a user connected to the viewing user and an object on which the user connected to the viewing user performed the action. The story generation engine 180 selects 312 the story content using any suitable method, such as those described above in conjunction with FIG. 2B.

The story generation engine 180 generates 314 the sponsored story unit including the selected story content. Hence, the generated sponsored story unit describes actions performed by one or more users connected to the viewing user on one or more objects, where the actions and/or the objects have one or more properties identified by a sponsored story request. In some embodiments, the generated sponsored story unit includes interface elements enabling the viewing user to interact with the sponsored story unit. The story generation engine 180 provides 316 the sponsored story unit to a client device 202 associated with the viewing user 110 for display.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing, in a social networking system, a user profile associated with a viewing user, the user profile identifying one or more other users of a social networking system who are connected to the viewing user in the social networking system;
receiving a story request for a sponsored story unit from an advertiser, the story request identifying one or more properties of content to be included in the requested sponsored story;
identifying one or more actions performed by the other users connected to the viewing user, the actions stored by the social networking system;
accessing data in the social networking system describing at least one of (1) properties of the one or more actions and (2) properties of one or more objects associated with the one or more actions;
selecting an action from the one or more actions based on matching the properties of content identified by the story request to at least one of the properties of the one or more actions and the properties of one or more objects associated with the one or more actions for the selected action;
generating a sponsored story unit based on the selected action, the sponsored story unit describing the selected action performed by another user connected to the viewing user;
providing the sponsored story unit for display to the viewing user.

2. The method of claim 1, wherein the one or more properties of content included in a sponsored story at least one of: a property of an action, a property of an object, a sub-property of a property of an object and a sub-property of a property of an action.

3. The method of claim 2, wherein the property of the action comprises an action type.

4. The method of claim 2, wherein the property of the object comprises an object type.

5. The method of claim 1, wherein selecting the action from the one or more actions based on matching the properties of content identified by the story request comprises:
selecting an action having a property identified by the story request or associated with an object having the property included in the story request.

6. The method of claim 1, wherein selecting the action from the one or more actions based on matching the properties of content identified by the story request comprises:

selecting an action having a plurality of properties of content identified by the story request or associated with an object having the plurality of properties identified by the story request.

7. The method of claim 1, wherein selecting the action from the one or more actions based on matching the properties of content identified by the story request comprises:

selecting an action having each property identified by the story request or associated with an object having each property identified by the story request.

8. The method of claim 1, wherein selecting the action from the one or more actions comprises:

determining an expected value associated with stories including different actions from the one or more actions based on an affinity of the viewing user for a user associated with an action and a bid amount included in the story request; and selecting an action having a highest expected value.

9. The method of claim 1, wherein selecting the action from the one or more actions comprises selecting an action having a most recent time.

10. The method of claim 1, wherein selecting the action from the one or more actions comprises:

determining affinities for the viewing user and a user connected to the viewing user associated with each action in the one or more actions; and selecting the action based on the affinities.

11. The method of claim 1, wherein the sponsored story unit includes an interface element for receiving input.

12. The method of claim 1, wherein the one or more actions performed by the other users connected to the viewing user include an action performed by a user connected to the viewing user on a website external to the social networking system.

13. A method comprising:

storing, in a social networking system, a user profile associated with a viewing user, the user profile identifying one or more other users of a social networking system who are connected to the viewing user in the social networking system;

receiving a story request for a sponsored story unit from an advertiser, the story request identifying one or more properties of content to be included in the requested sponsored story;

accessing data in the social networking system describing one or more actions performed by the other users connected to the viewing user and properties of the one or more actions;

selecting an action from the one or more actions based on matching the properties of content identified by the story request to the properties of the one or more actions;

generating a sponsored story unit based on the selected action, the sponsored story unit describing the selected action performed by another user connected to the viewing user;

providing the sponsored story unit for display to the viewing user.

14. The method of claim 13, wherein the one or more properties of content included in a sponsored story at least one of: a property of an action, a property of an object, a sub-property of a property of an object and a sub-property of a property of an action.

15. The method of claim 14, wherein the property of the action comprises an action type.

16. The method of claim 14, wherein the property of the object comprises an object type.

17. The method of claim 13, wherein selecting the action from the one or more actions comprises:

accessing data in the social networking system describing properties of one or more objects associated with the one or more actions; and selecting an action having one or more properties matching the properties of content identified by the story request or associated with one or more objects having at least one property matching the properties of content identified by the story request.

18. The method of claim 13, wherein the one or more actions performed by the other users connected to the viewing user include an action performed by a user connected to the viewing user on a website external to the social networking system.

19. The method of claim 13, wherein the one or more actions performed by the other users connected to the viewing user include an action performed by a user connected to the viewing user to an object external to the social networking system.

20. The method of claim 13, wherein the one or more properties of content included in a sponsored story at least one of: a property indicating an action was performed on a website external to the social networking system.

21. The method of claim 13, wherein the one or more properties of content included in a sponsored story at least one of: a property indicating an action was performed on an object external to the social networking system.

* * * * *